(12) United States Patent
Bruneau et al.

(10) Patent No.: US 11,036,704 B2
(45) Date of Patent: Jun. 15, 2021

(54) DATABASE SYSTEM

(71) Applicant: INTERSEC, Paris la Defense (FR)

(72) Inventors: Florent Bruneau, Carrieres sous Poissy (FR); Jean-Marc Coic, Bourg la Reine (FR)

(73) Assignee: INTERSEC, Paris la Defense (FR)

( * ) Notice: Subject to any disclaimer, the term of this patent is extended or adjusted under 35 U.S.C. 154(b) by 290 days.

(21) Appl. No.: 16/095,589

(22) PCT Filed: Apr. 25, 2017

(86) PCT No.: PCT/FR2017/050977
§ 371 (c)(1),
(2) Date: Oct. 22, 2018

(87) PCT Pub. No.: WO2017/187081
PCT Pub. Date: Nov. 2, 2017

(65) Prior Publication Data
US 2019/0087447 A1 Mar. 21, 2019

(30) Foreign Application Priority Data
Apr. 25, 2016 (FR) .................................... 1653621

(51) Int. Cl.
| | |
|---|---|
| *G06F 7/00* | (2006.01) |
| *G06F 16/22* | (2019.01) |
| *G06F 9/50* | (2006.01) |
| *G06F 12/02* | (2006.01) |
| *G06F 16/27* | (2019.01) |

(52) U.S. Cl.
CPC ........ *G06F 16/2228* (2019.01); *G06F 9/5016* (2013.01); *G06F 9/5083* (2013.01); *G06F 12/0284* (2013.01); *G06F 16/2282* (2019.01); *G06F 16/27* (2019.01); *G06F 2212/1016* (2013.01)

(58) Field of Classification Search
CPC .. G06F 16/2228; G06F 16/27; G06F 16/2282; G06F 9/5016; G06F 9/5083; G06F 12/0284; G06F 2212/1016
See application file for complete search history.

(56) References Cited

U.S. PATENT DOCUMENTS

| | | | | |
|---|---|---|---|---|
| 7,181,422 B1 * | 2/2007 | Philip | ............... | G06Q 40/00 705/35 |
| 2010/0036757 A1 * | 2/2010 | Patterson | ............... | G06Q 30/04 705/30 |
| 2011/0202444 A1 * | 8/2011 | Tully | ............... | G06Q 40/06 705/35 |
| 2017/0249697 A1 * | 8/2017 | Agrawal | ............... | G06Q 40/025 |

OTHER PUBLICATIONS

Osman Rash a et al., "Modelling Replication" In NoSQL Datastores. Sep. 8, 2014. Network and Parallel Computing; [Lecture Notes in Computer Science; Lect. Notes Computer]. Springer International Publishing. CHAM. pp. 194-209.

* cited by examiner

*Primary Examiner* — Azam M Cheema
(74) *Attorney, Agent, or Firm* — Volpe Koenig

(57) ABSTRACT

A database system (2) stores a database in the random-access memory of a plurality of computer devices (4) by organizing an efficient and robust distribution.

10 Claims, 2 Drawing Sheets

|     | h0 | h1 | h2 | h3 | h4 |
|-----|----|----|----|----|----|
| s1  | 2  | 0  | 3  | 1  | 4  |
| s2  | 1  | 3  | 0  | 2  | 4  |
| s3  | 3  | 2  | 1  | 0  | 4  |
| s4  | 1  | 2  | 3  | 4  | 0  |
| s5  | 0  | 3  | 1  | 4  | 2  |
| s6  | 3  | 0  | 2  | 4  | 1  |
| s7  | 2  | 1  | 0  | 4  | 3  |
| s8  | 2  | 3  | 4  | 0  | 1  |
| s9  | 3  | 1  | 4  | 2  | 0  |
| s10 | 0  | 2  | 4  | 1  | 3  |
| s11 | 1  | 0  | 4  | 3  | 2  |
| s12 | 3  | 4  | 0  | 1  | 2  |
| s13 | 1  | 4  | 2  | 0  | 3  |
| s14 | 2  | 4  | 1  | 3  | 0  |
| s15 | 0  | 4  | 3  | 2  | 1  |
| s16 | 4  | 0  | 1  | 2  | 3  |
| s17 | 4  | 2  | 0  | 3  | 1  |
| s18 | 4  | 1  | 3  | 0  | 2  |
| s19 | 4  | 3  | 2  | 1  | 0  |
| s20 | 0  | 1  | 2  | 3  | 4  |

Fig.3

DATABASE SYSTEM

FIELD OF THE INVENTION

The invention relates to the field of databases, and in particular their large-scale real-time applications.

BACKGROUND

An example is the management of mobile telephone operators' databases. Indeed, the latter permanently manage an extremely significant quantity of data relating to subscribers' telephone lines. Each telephone line generates numerous events of a passive nature such as connections, disconnections, changes of cell, registration with base stations, etc. A mobile operator typically has between 5 and 25 million subscribers, this representing a database whose size lies between several tens of gigabits and several terabits.

The provision of services, even basic ones, in this context, makes it necessary to be able to access the set of data relating to the lines and to process these data in diverse ways in real time. This is still more complex when it is a matter of offering services of promotional type, that is to say awarding predetermined bonuses to subscribers as a function of their consumption, or when it is a matter of analyzing in real time the behavior of the subscribers over a given area so as to reconfigure the resources in order to accommodate needs.

Solutions generally adopted for coping with these challenges involve the use of ever more powerful database systems, based on clusters of ever more significant dimensions, and which have now reached their limits.

SUMMARY

The invention improves the situation. For this purpose, the invention proposes a database system, comprising a plurality of computing devices and an allocator which is designed to distribute the data of the database over the computing devices. The computing devices are each designated by a host index and each comprise a random-access memory. The allocator is designed:

to organize a plurality of spaces indexed over each random-access memory, and to organize a part at least of the data of the database into tranches having a tranche index, to define a plurality of mutually distinct sequences each comprising a plurality of pairs whose number is equal to the number of computing devices, each pair associating a unique rank value and a host index, to maintain a list of the functional computing devices over time, to associate each tranche with a sequence of the plurality of sequences, on the basis of the list of functional computing devices, so that, for two tranches having respectively a first tranche index and a second tranche index such that the difference between the first tranche index and the second tranche index is equal to the number of sequences of the plurality of sequences, a given sequence of the plurality of sequences is associated with a single tranche whose tranche index lies between the first tranche index and the second tranche index, to define, for a tranche of given tranche index, from among the list of functional computing devices, a master space on the computing device whose host index is associated with the lowest rank in the sequence associated with the given tranche, the master space being chosen on the computing device as the space whose index corresponds to the given tranche index, to define, for a tranche of given tranche index, from among the list of functional computing devices, a plurality of slave spaces, chosen on computing devices in such a way that the sum of ranks which are associated with the host indices of these computing devices in the sequence associated with the given tranche is a minimum, each slave space being chosen on the respective computing device as the space whose index corresponds to the given tranche index.

The computing devices are furthermore designed in such a way that a computing device which receives a master space replicates the data of the associated tranche on the corresponding slave spaces.

This system is particularly advantageous since it makes it possible to produce a database which is stored entirely in RAM, thereby making it possible to obtain unequalled performance. Furthermore, this storage is carried out in a distributed manner, thereby making it possible at one and the same time to distribute the load over the diverse computing devices, but also to manage a tolerance to faults.

According to diverse variants, the device can exhibit one or more of the following characteristics:

the allocator is designed to define a number of slave spaces which is less than the number of computing devices minus one;

the allocator is designed to define, from among the plurality of slave spaces associated with a given tranche, a set of critical slave spaces and a set of tolerance slave spaces, and in which the master space associated with a given tranche is designed to confirm the writing of a datum relating to the given tranche solely when this datum has been replicated on the set of critical slave spaces of the given tranche;

the allocator is designed to define the plurality of distinct sequences and to associate each tranche with a sequence of the plurality of sequences by initializing, for each tranche index, a host index with the tranche index modulo the number of computing devices, and by repeating as many times as the number of computing devices a sequence in which:

if the host index is already associated with the tranche index, redefine the host index by adding one to it and by carrying out on the number obtained an operation modulo the number of computing devices, until a host index is found which is not already associated with the tranche index, the tranche index is associated with the host index, and with a rank whose value is derived from the iteration of the sequence, the host index is redefined by adding to it the value one as well as the tranche index modulo the result of the subtraction of a natural integer from the number of computing devices, and by carrying out on the result of these additions an operation modulo the number of computing devices, said natural integer being the same for all the repetitions of the sequence and chosen so that the number of computing devices and the number of computing devices minus said natural integer are mutually prime; and the allocator is designed to define the plurality of distinct sequences on the basis of a plurality of distinct pairs associating an initialization index lying between 0 and the number of computing devices, and a traversal index lying between 1 and the number of computing devices minus one, each distinct sequence being generated initializing a host index with the initialization index, and by repeating as many times as the number of computing devices a sequence in which:

if the host index is already associated with the tranche index, redefine the host index by adding one to it and by carrying out on the number obtained an operation modulo the number of computing devices, until a host index is found which is not already associated with a rank, the host index is associated with a rank whose value is derived from the iteration of the sequence, the host index is redefined by adding the value of the traversal index to it, and by carrying out on the result of this addition an operation modulo the number of computing devices.

The invention also relates to a database management method, comprising the distributing of the data of the database over a plurality of computing devices, comprising the following operations:

(a) associating a host index with each computing device, (b) organizing a plurality of spaces indexed on the random-access memory of each computing device, (c) organizing a part at least of the data of the database into tranches having a tranche index, (d) defining a plurality of mutually distinct sequences each comprising a plurality of pairs whose number is equal to the number of computing devices, each pair associating a unique rank value and a host index, (e) associating each tranche with a sequence of the plurality of sequences, on the basis of the list of functional computing devices, so that, for two tranches having respectively a first tranche index and a second tranche index such that the difference between the first tranche index and the second tranche index is equal to the number of sequences of the plurality of sequences, a given sequence of the plurality of sequences is associated with a single tranche whose tranche index lies between the first tranche index and the second tranche index, in (e1) defining, for a tranche of given tranche index, from among the list of functional computing devices, a master space on the computing device whose host index is associated with the lowest rank in the sequence associated with the given tranche, the master space being chosen on the computing device as the space whose index corresponds to the given tranche index, (e2) defining, for a tranche of given tranche index, from among the list of functional computing devices, a plurality of slave spaces, chosen on computing devices in such a way that the sum of ranks which are associated with the host indices of these computing devices in the sequence associated with the given tranche is a minimum, each slave space being chosen on the respective computing device as the space whose index corresponds to the given tranche index, (f) storing the data of each given tranche on the master space which is associated therewith, (g) replicating the data stored on the master spaces on the corresponding slave spaces.

This method can comprise the one or more of the following characteristics:

the operation (e2) comprises the defining of a number of slave spaces which is less than the number of computing devices minus one;

the operation (e2) comprises the defining, from among the plurality of slave spaces associated with a given tranche, a set of critical slave spaces and a set of tolerance slave spaces, and furthermore comprising the operation (h) confirming the writing of a datum relating to a given tranche solely when the master space associated with the given tranche has replicated this datum on the set of critical slave spaces of the given tranche;

the operations (d) and (e) are carried out:

by initializing, for each tranche index, a host index with the tranche index modulo the number of computing devices, and by repeating as many times as the number of computing devices a sequence in which:

if the host index is already associated with the tranche index, redefine the host index by adding one to it and by carrying out on the number obtained an operation modulo the number of computing devices, until a host index is found which is not already associated with the tranche index, the tranche index is associated with the host index, and with a rank whose value is derived from the iteration of the sequence, the host index is redefined by adding to it the value one as well as the tranche index modulo the result of the subtraction of a natural integer from the number of computing devices, and by carrying out on the result of these additions an operation modulo the number of computing devices, said natural integer being the same for all the repetitions of the sequence and chosen so that the number of computing devices and the number of computing devices minus said natural integer are mutually prime; and the operation (d) comprises:

(d1) defining a plurality of distinct pairs associating an initialization index lying between 0 and the number of computing devices, and a traversal index lying between 1 and the number of computing devices minus one, (d2) for each distinct pair, initializing a host index with the initialization index, and repeating as many times as the number of computing devices the following operations:

(d21) if the host index is already associated with the tranche index, redefine the host index by adding one to it and by carrying out on the number obtained an operation modulo the number of computing devices, until a host index is found which is not already associated with a rank, (d22) associate the host index with a rank whose value is derived from the number of repetitions of the operation (d2) that have already been carried out for the current distinct pair; and (d23) redefine the host index by adding the value of the traversal index to it, and by carrying out on the result of this addition an operation modulo the number of computing devices.

The invention relates finally to a computer program product comprising program code portions for implementing the device or the method described above when said program is executed on a computer.

BRIEF DESCRIPTION OF THE DRAWINGS

Other characteristics and advantages of the invention will become better apparent on reading the description which follows, derived from examples which are given by way of nonlimiting illustration and derived from the drawings in which:

FIG. 3 represents an exemplary assignment of tranches to spaces according to invention.

DETAILED DESCRIPTION OF THE PREFERRED EMBODIMENTS

The drawings and the description hereinafter contain, in essence, elements of a definite character. They will therefore be able not only to serve to better elucidate the present invention, but also to contribute to its definition, if relevant.

The present description is of such a nature as to involve elements susceptible of protection by author's right and/or copyright. The owner of the rights has no objection to the identical reproduction by anyone of the present patent document or of its description, such as it appears in the official records. For the remainder, it fully reserves its rights.

Figure 1:
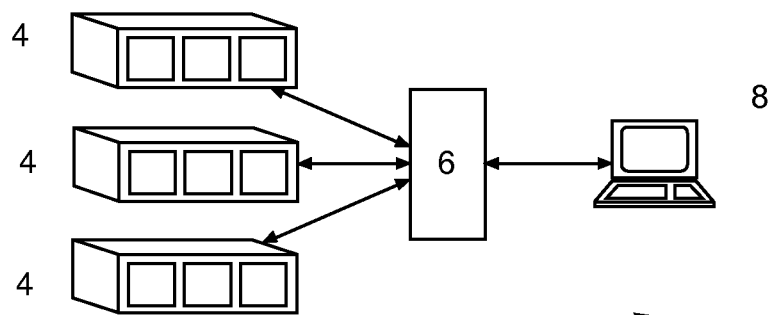
FIG. 1 represents a database system according to invention in its environment.

FIG. 1 represents a database system 2 according to the invention in its environment. In the example described here, the system 2 comprises a plurality of computing devices 4, an allocator 6 and a terminal 8. The terminal 8 makes it possible in the example described here to offer mobile telephone subscriber data management services, for example set up automatic consumption bonus processes as a function of the behavior of subscribers. Accordingly, the terminal 8 accesses the mobile telephone database which is stored on the computing devices 4 and whose distribution is managed by the allocator 6. More precisely, the function of allocator 6 is the distributing of the data of the database over the random-access memories of the computing devices 4 and interactions with the terminal 8 so as to guarantee that a modified datum has indeed been recorded in the database and has formed the subject of a sufficient number of replications.

The computing devices 4 can be any computing device able to be implemented in a network of devices managed by the allocator 6. This may entail a conventional computer, a board-like computer, or any other computing apparatus whose random-access memory can be addressed by the allocator 6. By random-access memory is meant any memory exhibiting an access time of less than 100 ns. The computing devices 4 can be used purely for storage purposes, that is to say that the allocator 6 commands them entirely and exclusively for the storage of the data of the database. As a variant, the computing devices 4 can also be used as calculation resources for the purposes of the applications on the database.

The allocator 6 can be embodied in the form of a computing code executed on one or more processors. By processors must be understood any processor suitable for the calculations described below. Such a processor can be embodied in any known way, in the form of a microprocessor for personal computer, of a dedicated microchip of FPGA or SoC ("system on chip") type, of a calculation resource on a grid, of a microcontroller, or of any other form able to provide the calculation power necessary for the embodiment described below. One or more of these elements can also be embodied in the form of specialized electronic circuits such as an ASIC. A combination of processor and of electronic circuits can also be envisaged. The allocator 6 can also be implemented on one or more of the computing devices 4.

As will be explained with FIG. 2, the allocator 6 organizes the data of the database into a plurality of indexed tranches. This signifies that certain lines are contained in a first tranche, others in a second tranche, etc. This can also be carried out table by table, or by a mixture of these two possibilities. This slicing is unique, so that a particular datum of the database is situated in one single tranche. In the example described here, the allocator 6 organizes the totality of the database. As a variant, the allocator 6 can organize just a part of the database as described below, and store the remainder of the database in a different manner. In the same manner as it organizes the database, the allocator 6 organizes the random-access memories of the computing devices 4. Thus, the allocator 6 can access a plurality of indexed spaces which each designate a part of a random-access memory on the computing devices 4. Here also, this indexing is unique, so that a given space corresponds to a single portion of a random-access memory of a computing device 4.

Thus, the allocator 6 organizes the replication in a very specific manner of the indexed tranches of the database on the indexed spaces of the random-access memories of the computing devices 4. The replication is all the more important as random-access memories, though they offer unequalled performance in respect of speed and capacity of data processing, are particularly sensitive to faults. Indeed, they are not capable of retaining the data that they contain if the computing device 4 which receives them is not energized. Thus, if for any reason a computing device 4 interrupts its operation, whether it be because of a system fault or of an electrical fault, the data contained in the random-access memory of this computing device 4 will be lost, and the database risks being incomplete and/or corrupted.

Moreover, in order to optimize the performance of the database system 2, it may be beneficial to dimension the number of computing devices 4 and the random-access memory that they embed as a function of the operations sought. Indeed, it is important to balance the load over the whole of the system of databases 2, both for instantaneous and current usage and for recovery in case of fault. By distributing the tranches over the spaces in an intelligent manner, the performance of the database system 2 can be optimized when functioning normally. But this distribution must also take account of exceptional cases, such as the loss of a given computing device 4, and the necessity to use spaces containing replicas in order to function. These operations are all the more complex as, in the case of a database stored on random-access memories in a distributed manner, the risks of fault are more significant than in conventional-database storage systems.

Thus, the allocator 6 defines for each tranche of the database a space which is referred to as master and a plurality of spaces are referred to as slaves. The master space will be the one which will be called by the terminal 8 for any operation of reading or writing of the database for the tranche concerned. Once the data have been stored on the master space, the allocator 6 organizes the replication of the data on the set of slave spaces, in an order indicated by a respective rank associated with each of the slave spaces.

According to the invention, the allocator 6 determines in an absolute manner the tranches of the database which are accessible at a given instant. Accordingly, the allocator 6 determines that a given tranche of the database is accessible only if it is present on a master space and on at least a minimum number of slave spaces. In the example described here, this number is in general equal to 1 or 2. In the same manner, the writing of a datum is confirmed only when the latter has been replicated at least in the minimum number of slave spaces. These slave spaces will be called critical slave spaces hereinafter.

Furthermore, the allocator 6 can also fix a maximum number of slave spaces which is less than the number of computing devices 4. In the example described here, the maximum number of slave spaces is in general chosen equal to the minimum number of slave spaces plus 1 or 2. In this case, for a given tranche, the database system 2 is capable of tolerating the loss of a number of computing devices 4 receiving a space (master or slave) storing the given tranche equal to the maximum number minus the minimum number of slave spaces. The slave spaces beyond the minimum number of slave spaces will be called tolerance slave spaces hereinafter.

Figure 2:
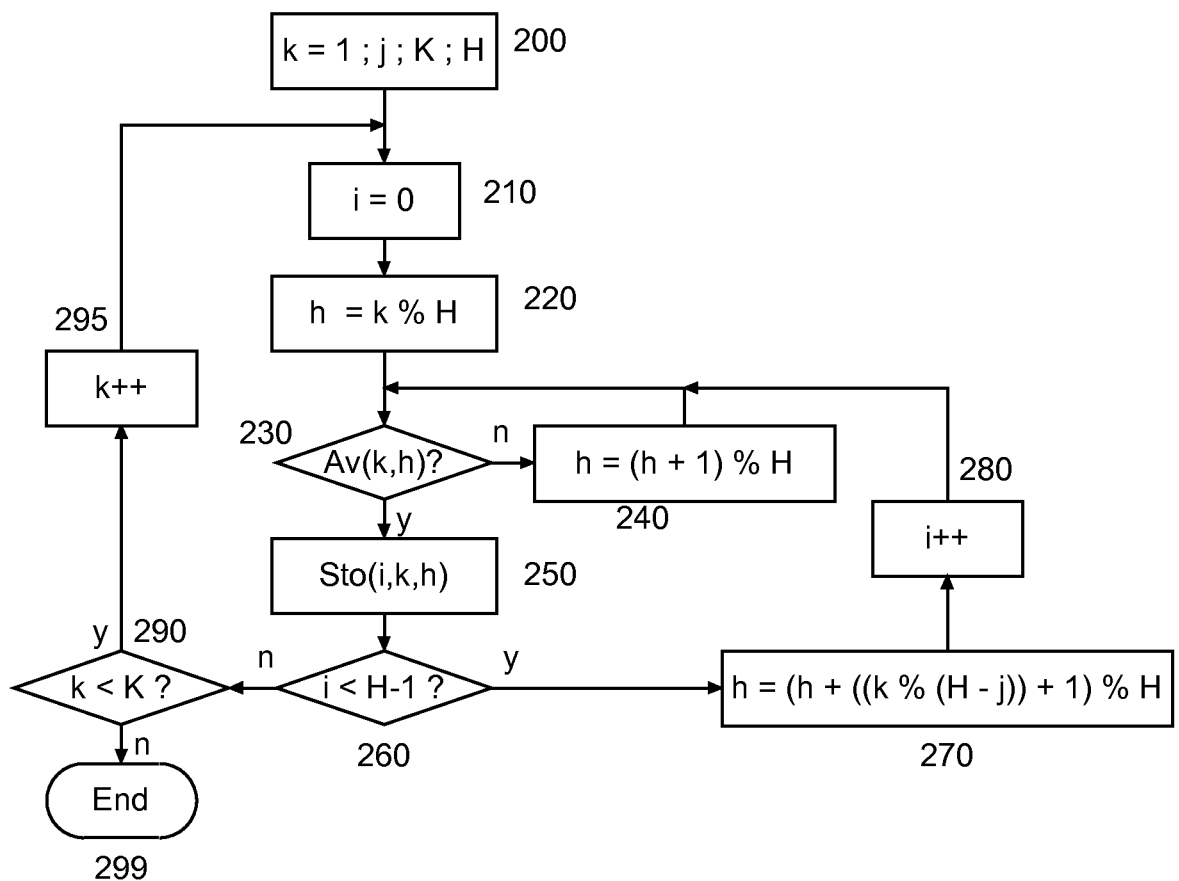
FIG. 2 represents an example of a function implemented by the allocator of FIG. 1.

FIG. 2 represents an example of a function implemented by the allocator 6 to assign the tranches to spaces and to determine a rank for the spaces. This function is implemented on initialization of the database system 2, as well as each time that a device is added or removed definitively, that is to say each time that the architecture of the computing devices 4 that are used changes in a non-temporary manner.

In an operation 200, a tranche index k is initialized with the value 1, an integer number j which is fixed for all the executions of this function is received, as well as a number of tranches K and a number of computing devices H.

In an operation 210, a loop is launched with the initialization to 1 of a loop iteration index i. The function of this loop is the allotting of a rank to each of the spaces whose index in the random-access memories of the computing devices 4 is equal to the current tranche index k.

The loop is also initialized with an operation 220 in which a host index h is initialized with the corresponding value of the current tranche index k modulo the number of computing devices H.

Thereafter, in an operation 230, a function Av( ) which receives as arguments the current tranche index k and the host index h is executed. This function determines whether the space of index k in the computing device 4 of index h is already associated with a tranche. If such is the case, then the host index h is updated in an operation 240, and the operation 230 is repeated until a free space is found. In the operation 240, the host index h is updated with the value corresponding to the index h plus 1 modulo the number of computing devices H.

Thus, when a new computing device 4 is added as resource, or when a computing device 4 becomes accessible again following a fault, only the spaces which do not have a tranche which is allotted to them get updated.

Once a free space has been determined, a function Sto( ) receiving as arguments the loop iteration index i, the current tranche index k, and the host index h is executed. The function Sto( ) associates the tranche of current index k with the space of index k on the computing device 4 of index h, and assigns this space a rank equal to the loop iteration index i. Thus, when the rank 0 is allotted to a space, the latter is the master space for the tranche of index k. The other iterations associate critical or tolerance slave spaces. The copying, updating and/or replication of the data of a given tranche on a space newly associated with this tranche can be carried out as soon as the rank is assigned or can be done later.

Thereafter, the loop iteration index i is compared with the number of computing devices H−1 in an operation 260 so as to determine whether all the spaces of current index k have been associated with the tranche of current index k. When spaces remain to be associated, the host index h is updated in an operation 270, the loop iteration index i is incremented in an operation 280, and the loop resumes with the operation 230. In the operation 270, to the current host index h is added a value equal to 1 plus the current tranche index k modulo the difference between the number of computing devices H and the integer number j, the whole modulo the number of computing devices H.

According to the invention, the integer number j is chosen so that the number of computing devices H and the number of computing devices H minus the integer number j are mutually prime.

The Applicant has discovered that this formula is particularly advantageous since it offers a static distribution of rank which is independent of the state of the tranches. Thus, real-time updating requires only the list of available computing devices 4 as well as the state of replication of the tranches, without it being necessary to take account of the load of the computing devices 4.

The Applicant has also discovered that the best results were obtained by fixing j equal to 1. Indeed, according to the invention, the allocator defines H*(H−j) distinct sequences of assignment of ranks. Therefore, when K is greater than H*(H−j), certain rank assignment sequences will be repeated, and the loss of a given computing device 4 will affect several tranches for which a master or slave space was assigned to the latter. By fixing j equal to 1, it is possible to maximize the value H*(H−j) and therefore to increase the resilience of the database system 2.

Moreover, this distribution ensures a high stability for the database system 2 by allowing the designation of a calibrated number of slave spaces so as to tolerate a chosen number of faults per tranche. This guarantees a service continuity chosen according to the needs of the application, and also makes it possible to balance the load over the database system 2 in an optimal manner by making it possible to choose in an optimal manner the times at which the tolerance slave spaces must be updated and/or recovered. Indeed, it suffices for the master space and the critical slave spaces of a given tranche to be up-to-date in order for the tranche to be considered up-to-date and active. The processing of the tolerance slave spaces can be carried out at the most important time from the point of view of the load of the system of databases.

Finally, this formula guarantees the stability of the assignment of the tranches to the spaces, since as and when the computing devices 4 are recovered after faults, it is always the same spaces that will be assigned as master space, critical slave spaces, and tolerance slave spaces.

The Applicant has also discovered that still better results can be obtained when the number of computing devices H is a prime number.

Once all the spaces have been assigned for a given tranche index k, the latter is compared with the number of tranches K in an operation 290. If tranches remain to be associated, then the tranche index k is incremented in an operation 295. Otherwise the function terminates in an operation 299.

FIG. 3 represents an allocation example obtained with the function of FIG. 2, with a number of computing devices H equal to 5 and a number of tranches K equal to 20.

On the basis of the associations carried out with the function described in FIG. 2, the allocator 6 can initialize the database system 2 on the basis of the following rules:

for each tranche, the space of rank 0 of smallest rank having at its disposal an up-to-date copy of the data of the tranche is designated as master space, the r accessible spaces of rank which are the lowest and not having been designated as master are designated as critical slave spaces, the R−r accessible spaces of succeeding ranks are designated as tolerance slave spaces, the H−R−1 remaining spaces (if they exist) are not assigned, and will be able to become tolerance and/or critical slave spaces if sufficient computing devices 4 develop a fault.

Thereafter, all the spaces are progressively filled in order of importance, that is to say firstly the master, then the critical slaves and finally the tolerance slaves. As soon as the master space and the critical spaces of a given tranche are filled, the corresponding tranche is declared accessible to the terminal 8.

This is an important step, since, until the loss of a computing device 4, the allocator 6 no longer intervenes directly in the replication of the data, the master being in charge of maintaining the data of its up-to-date slaves.

When a computing device 4 encounters a failure, several cases are possible for a given tranche:
    a. the computing device 4 contained an unassigned space,
    b. the computing device 4 contained a tolerance slave space,
    c. the computing device 4 contained a critical slave space,
    d. the computing device 4 contained the master space.

In case a., nothing happens, since this event is neutral in relation to the integrity of the data.

In case b., several solutions can be implemented. A first solution consists, if no other tranche is impacted by a case c. or d., in waiting to see whether the computing device 4 regains its state, so as to avoid needless data exchanges. Another solution is that the master space accesses a table internal to the computing device 4 which receives it comprising the ranks of the slave spaces and determines the accessible slave space of lowest rank for the given tranche. Thereafter, the master space organizes the replication of its data on this slave space. According to a third solution, the master space calls the allocator 6 which maintains the table of active computing devices 4 and indicates to the master space the new slave space to organize the replication of the data.

In case c., two solutions can be implemented. According to a first solution, the master space accesses a table internal to the computing device 4 which receives it comprising the ranks of the slave spaces and determines the accessible slave space of lowest rank for the given tranche. Thereafter, the master space organizes the replication of its data on this slave space. According to the second solution, the master space calls the allocator 6 which maintains the table of active computing devices 4 and indicates to the master space the new slave space to organize the replication of the data. In the case where no slave space is available to replicate the data of the master space, the given tranche is deactivated until r critical slave spaces are again up-to-date.

In case d., the allocator 6 chooses the master slave from among the spaces associated with the given tranche of which it is acquired that their data are up-to-date by designating the one which exhibits the lowest rank, and the slave spaces get reallotted their role (critical slave space or tolerance slave space) in such a way that the sum of the ranks of the selected slave spaces is a minimum. Accordingly, the solutions described in relation to cases b. and c. are implemented.

The computing devices 4 are furthermore designed to declare their state regularly to the allocator 6. Thus, for a given tranche, as soon as a slave space is up-to-date in terms of replication of data and as soon as it exhibits a lower rank than the master space, the allocator 6 triggers an operation similar to case d. so as to ensure that the master space for the given tranche is the one of lowest rank, and that the slave spaces are selected so as to minimize the sum of their ranks Thus, the operations of writing, updating and/or replication for each of the spaces can be carried out in most cases without calling upon the allocator 6, it being possible for the latter to be invoked only when a master space is on a computing device 4 experiencing a failure.

A certain number of variants will be able to be envisaged in view of FIG. 2, for example by varying the operation 220 to change the first computing device 4 that is tested. Advantageously, such variants will depend on the current tranche index k.

For example, the allocator 6 could begin by drawing H*H−k pairs (i,j) where i is chosen between 0 and H, and j between 1 and H−k, and then, for each series of H*(H−k) tranches, a pair is drawn at random, each pair being drawn once, and the ranks are assigned according to a sequence of the type:
    rank 0 assigned to the space of the host of index i,
    succeeding ranks assigned by repeating the formula h=(h+j) modulo H (in place of the operation 270, while avoiding the spaces to which a rank has already been assigned as with the operation 240).

According to this variant, the same rank assignment sequences will be carried out as with FIG. 5, but in an order dependent on the order of drawing of the pairs (i,j). Other variants will be able to be envisaged provided that they make it possible to obtain a balanced and cyclic distribution over H*(H−j) tranches.

The invention claimed is:

1. A database system, comprising a plurality of computing devices and an allocator which is designed to distribute data of a database over the plurality of computing devices, wherein the plurality of computing devices are each designated by a host index and each comprise a random-access memory,
    wherein the allocator is configured:
        to organize a plurality of spaces indexed over each random-access memory, and to organize a part at least of the data of the database into tranches having a tranche index,
        to define a plurality of mutually distinct sequences each comprising a plurality of pairs whose number is equal to the number of computing devices of the plurality of computing devices, each pair associating a unique rank value and a host index,
        to maintain a list of functional computing devices over time,
        to associate each tranche with a sequence of the plurality of mutually distinct sequences, on the basis of the list of functional computing devices, so that, for two tranches having respectively a first tranche index and a second tranche index such that a difference between the first tranche index and the second tranche index is equal to the number of sequences of the plurality of mutually distinct sequences, a given sequence of the plurality of mutually distinct sequences is associated with a single tranche whose tranche index lies between the first tranche index and the second tranche index,
        to define, for a tranche of given tranche index, from among the list of functional computing devices, of the plurality of computing devices, a master space on a computing device, of the plurality of computing devices, whose host index is associated with the lowest rank in the sequence associated with the given tranche, the master space being chosen as the space whose index corresponds to the given tranche index,
        to define, for a tranche of given tranche index, from among the list of functional computing devices, a plurality of slave spaces, chosen on computing devices, of the plurality of computing devices, in such a way that the sum of ranks which are associated with the host indices of these computing devices in the sequence associated with the given tranche is a minimum, each slave space being chosen on a respective computing device as the space whose index corresponds to the given tranche index, and the plurality of computing devices are configured such that one of the computing devices of the plurality of computing devices, which receives a master space replicates the data of the associated tranche on the corresponding slave spaces.

2. The system as claimed in claim 1, wherein the allocator is configured to define a number of slave spaces which is less than the number of computing devices of the plurality of computing devices minus one.

3. The system as claimed in claim 1, wherein the allocator is configured to define, from among the plurality of slave spaces associated with a given tranche, a set of critical slave spaces and a set of tolerance slave spaces, and the master space associated with a given tranche is designed to confirm the writing of a datum relating to the given tranche solely when said datum has been replicated on the set of critical slave spaces of the given tranche.

4. The system as claimed in claim 1, wherein the allocator is configured to define the plurality of distinct sequences and to associate each tranche with a sequence of the plurality of sequences by initializing, for each tranche index, a host index with the tranche index modulo the number of computing devices, and by repeating as many times as the number of computing devices a sequence in which:

if the host index is already associated with the tranche index, redefine the host index by adding one thereto and by carrying out on the number obtained an operation modulo the number of computing devices of the plurality of computing devices, until a host index is found which is not already associated with the tranche index, the tranche index is associated with the host index, and with a rank whose value is derived from the iteration of the sequence, the host index is redefined by adding to it the value one as well as the tranche index modulo the result of the subtraction of a natural integer from the number of computing devices, and by carrying out on the result of said additions an operation modulo the number of computing devices of the plurality of computing devices, said natural integer being the same for all the repetitions of the sequence and chosen so that the number of computing devices of the plurality of computing devices and the number of computing devices of the plurality of computing devices minus said natural integer are mutually prime.

5. The system as claimed in claim 1, wherein the allocator is configured to define the plurality of distinct sequences on the basis of a plurality of distinct pairs associating an initialization index lying between 0 and the number of computing devices of the plurality of computing devices, and a traversal index lying between 1 and the number of computing devices of the plurality of computing devices minus one, each distinct sequence being generated initializing a host index with the initialization index, and by repeating as many times as the number of computing devices of the plurality of computing devices a sequence in which:

if the host index is already associated with the tranche index, redefine the host index by adding one to it and by carrying out on the number obtained an operation modulo the number of computing devices of the plurality of computing devices, until a host index is found which is not already associated with a rank, the host index is associated with a rank whose value is derived from the iteration of the sequence, the host index is redefined by adding the value of the traversal index to it, and by carrying out on the result of said addition an operation modulo the number of computing devices of the plurality of computing devices.

6. A database management method, comprising distributing data of the database over a plurality of computing devices, the method comprising the following operations:

(a) associating a host index with each computing device, (b) organizing a plurality of spaces indexed on the random-access memory of each computing device of the plurality of computing devices, (c) organizing a part at least of the data of the database into tranches having a tranche index, (d) defining a plurality of mutually distinct sequences each comprising a plurality of pairs whose number is equal to the number of computing devices of the plurality of computing devices, each pair associating a unique rank value and a host index, (e) associating each tranche with a sequence of the plurality of sequences, on the basis of a list of functional computing devices, so that, for two tranches having respectively a first tranche index and a second tranche index such that a difference between the first tranche index and the second tranche index is equal to the number of sequences of the plurality of sequences, a given sequence of the plurality of sequences is associated with a single tranche whose tranche index lies between the first tranche index and the second tranche index, by:

(e1) defining, for a tranche of given tranche index, from among the list of functional computing devices, a master space on the computing device, of the plurality of computing devices, whose host index is associated with the lowest rank in the sequence associated with the given tranche, the master space being chosen as the space whose index corresponds to the given tranche index, (e2) defining, for a tranche of given tranche index, from among the list of functional computing devices, a plurality of slave spaces, chosen on computing devices of the plurality of computing devices, in such a way that the sum of ranks which are associated with the host indices of these computing devices in the sequence associated with the given tranche is a minimum, each slave space being chosen on a respective computing device as the space whose index corresponds to the given tranche index, (f) storing the data of each given tranche on the master space which is associated therewith, (g) replicating the data stored on the master spaces on the corresponding slave spaces.

7. The method as claimed in claim 6, wherein the operation (e2) further comprises defining of a number of slave spaces which is less than the number of computing devices, of the plurality of computing devices, minus one.

8. The method as claimed in claim 6, wherein the operation (e2) further comprises defining, from among the plurality of slave spaces associated with a given tranche, a set of critical slave spaces and a set of tolerance slave spaces, the method further comprising:

(h) confirming writing of a datum relating to a given tranche solely when the master space associated with the given tranche has replicated said datum on the set of critical slave spaces of the given tranche.

9. The method as claimed in claim 6, wherein operations (d) and (e) are carried out:

by initializing, for each tranche index, a host index with the tranche index modulo the number of computing devices, and by repeating as many times as the number of computing devices a sequence in which:

if the host index is already associated with the tranche index, redefine the host index by adding one thereto and by carrying out on the number obtained an operation modulo the number of computing devices, of the plurality of computing devices, until a host index is found which is not already associated with the tranche index, the tranche index is associated with the host index, and with a rank whose value is derived from the iteration of the sequence, the host index is redefined by adding thereto the value one as well as the tranche index modulo the result of the subtraction of a natural integer from the number of computing devices, and by carrying out on the result of these additions an operation modulo the number of computing devices, of the plurality of computing devices, said natural integer being the same for all the repetitions of the sequence and chosen so that the number of computing devices, of the plurality of computing devices, and the number of computing devices of the plurality of computing devices, minus said natural integer are mutually prime.

10. The method as claimed in claim 6, wherein operation (d) comprises:
(d1) defining a plurality of distinct pairs associating an initialization index lying between 0 and the number of computing devices, of the plurality of computing devices, and a traversal index lying between 1 and the number of computing devices, of the plurality of computing devices, minus one,
(d2) for each distinct pair, initializing a host index with the initialization index, and repeating as many times as the number of computing devices the following operations:
(d21) if the host index is already associated with the tranche index, redefine the host index by adding one thereto and by carrying out on the number obtained an operation modulo the number of computing devices (4), of the plurality of computing devices, until a host index is found which is not already associated with a rank,
(d22) associate the host index with a rank whose value is derived from the number of repetitions of the operation (d2) that have already been carried out for the current distinct pair,
(d23) redefine the host index by adding the value of the traversal index to it, and by carrying out on the result of said addition an operation modulo the number of computing devices of the plurality of computing devices.

* * * * *